(12) United States Patent
Wennerberg

(10) Patent No.: US 9,903,749 B2
(45) Date of Patent: Feb. 27, 2018

(54) METHOD AND DEVICE FOR PROVIDING AN INDICATION OF THE RELIABILITY OF A PROCESS PARAMETER VALUE TO A HOST SYSTEM

(75) Inventor: Tomas Wennerberg, Kallered (SE)

(73) Assignee: Rosemount Tank Radar AB, Gothenburg (SE)

( * ) Notice: Subject to any disclaimer, the term of this patent is extended or adjusted under 35 U.S.C. 154(b) by 674 days.

(21) Appl. No.: 13/116,549

(22) Filed: May 26, 2011

(65) Prior Publication Data

US 2012/0304023 A1    Nov. 29, 2012

(51) Int. Cl.
G01F 23/284    (2006.01)
G01F 23/00     (2006.01)
G01D 3/08      (2006.01)
G01D 21/00     (2006.01)

(52) U.S. Cl.
CPC .......... *G01F 23/284* (2013.01); *G01D 3/08* (2013.01); *G01D 21/00* (2013.01); *G01F 23/0076* (2013.01)

(58) Field of Classification Search
None
See application file for complete search history.

(56) References Cited

U.S. PATENT DOCUMENTS

| | | | |
|---|---|---|---|
| 5,710,552 A | 1/1998 | McCoy et al. ........... 340/870.21 |
| 7,088,285 B2 | 8/2006 | Smith ........................... 342/124 |
| 7,280,048 B2 * | 10/2007 | Longsdorf et al. ........... 340/664 |
| 7,319,401 B2 | 1/2008 | Akerstrom et al. |
| 7,525,476 B1 | 4/2009 | Delin et al. .................... 342/124 |
| 7,551,122 B1 * | 6/2009 | Delin .................... G01F 23/284 342/124 |
| 2005/0168343 A1 | 8/2005 | Longsdorf et al. |

(Continued)

FOREIGN PATENT DOCUMENTS

CN    1874172    12/2006
CN    101010570    8/2007

(Continued)

OTHER PUBLICATIONS

International Search Report for PCT Application No. PCT/EP2011/066852, dated Mar. 6, 2012, 3 pages.

(Continued)

*Primary Examiner* — Firmin Backer
*Assistant Examiner* — Shawna M Kingston
(74) *Attorney, Agent, or Firm* — Westman, Champlin & Koehler, P.A.

(57) ABSTRACT

A field device for determining a process parameter value, comprising a measurement device for determining a process parameter value; circuitry for determining the reliability of the process parameter value; and signaling circuitry for providing the process parameter value and an indication of the reliability of the process parameter value to a host system via a current loop. The signaling circuitry is configurable between a first state in which the indication of the reliability is provided as a digital signal and the process parameter value is provided as an analog DC-value, and a second state in which the indication of the reliability is provided as a predetermined analog DC-value. Hereby, the number of unplanned process interruptions may be reduced when the host system is capable of receiving digital signals.

19 Claims, 3 Drawing Sheets

(56) References Cited

U.S. PATENT DOCUMENTS

| | | | |
|---|---|---|---|
| 2007/0243830 A1 | 10/2007 | Isenmann et al. | 455/67.11 |
| 2008/0079419 A1 | 4/2008 | Lyon | 324/158.1 |
| 2008/0100501 A1 | 5/2008 | Edvardsson | |
| 2009/0273506 A1 | 11/2009 | Delin | |
| 2012/0304023 A1 | 11/2012 | Wennerberg | |

FOREIGN PATENT DOCUMENTS

| | | |
|---|---|---|
| CN | 101147181 | 3/2008 |
| CN | 101174733 | 5/2008 |
| CN | 102047082 A | 5/2011 |
| CN | 202533148 | 11/2012 |
| WO | WO 2004/076986 A1 | 9/2004 |
| WO | WO 2006/022587 | 3/2006 |

OTHER PUBLICATIONS

Written Opinion for International Search Report for PCT Application No. PCT/EP2011/066852, dated Mar. 6, 2012, 6 pages.
Office Action from Chinese Patent Application No. 201110291340.0, dated Dec. 22, 2015.
Office Action from Chinese Patent Application No. 201110291340.0, dated Jul. 26, 2016.

\* cited by examiner

METHOD AND DEVICE FOR PROVIDING AN INDICATION OF THE RELIABILITY OF A PROCESS PARAMETER VALUE TO A HOST SYSTEM

FIELD OF THE INVENTION

The present invention relates to a method and a field device for providing a process parameter value to a host system.

TECHNICAL BACKGROUND

Field devices, such as radar level gauges, are suitably used for measuring the level of products such as process fluids, granular compounds and other materials. An example of such a radar level gauge can include a microwave unit for transmitting microwaves towards the surface and receiving microwaves reflected by the surface, processing circuitry arranged to communicate with the microwave unit and to determine the level based on a relation between transmitted and received microwaves, an interface for connecting said processing circuitry externally of the radar level gauge, and a power management circuitry providing the microwave unit and the processing circuitry with operating power.

Radar level gauges for measuring a level in a tank, and other types of field devices, may often communicate with a remote location, such as a control room, by means of a current loop, such as a 4-20 mA industrial loop with or without superimposed digital communication.

For a 4-20 mA industrial loop interface without superimposed digital communication, the information which can be transmitted is limited in that only the magnitude of the current flowing through the current loop may be used to carry information. An example of a 4-20 mA industrial loop communication protocol capable of using superimposed digital communication is the HART-protocol.

In circumstances where the quality of the measurement value from the field device may be degraded, it is desirable to provide an indication to the host system that the measurement value has a reduced or degraded reliability. Accordingly, in a field device connected by a 4-20 mA industrial loop interface, an indication that the measurement value has a reduced reliability is commonly transmitted as a predetermined analog current value regardless of the reason and severity of the degradation of the reliability.

However, if the field device is part of a process control system, an indication from the field device that the measurement value has a reduced reliability may lead to a direct and unplanned interruption of the process. This means that a process may be interrupted by a less severe condition such as a reduction in accuracy. As such unplanned interruptions may be both costly and time consuming, it is highly desirable to reduce the occurrence of unplanned process events.

SUMMARY OF THE INVENTION

In view of the above-mentioned and other drawbacks of the prior art, a general object of the present invention is to provide an improved method and device for providing an indication of the reliability of a value of a process parameter to a host system.

According to a first aspect of the present invention, these and other objects are achieved through a method of providing an indication of the reliability of a process parameter value from a field device to a host system via a current loop, comprising the steps of: determining a process parameter value; determining a reliability of the process parameter value; determining whether or not the host system is capable of receiving a digital signal via the current loop; if the host-system is capable of receiving a digital signal via the current loop, providing, via the current loop, an indication of the reliability of the process parameter value as a digital signal, and providing the process parameter value as an analog direct current (DC) value; and if the host-system is not capable of receiving a digital signal via the current loop and the process parameter value has been determined to exhibit a reduced reliability, providing, via the current loop, an indication of the reduced reliability as a predetermined analog direct current value.

It should be noted that the method according to the present invention is by no means limited to performing the steps thereof in any particular order.

The present invention is based on the realization that fewer unplanned interruptions in a process may be achieved by, when possible, providing an indication of the reliability of the measured process parameter value to the host system as a digital signal and the process parameter value as an analog DC-value. In a system where a field device is connected to a host system via a current loop, the communication between the field device and the host system may be based on a current loop signaling scheme for example using a two-wire or a four-wire connection. A host system communicating via a current loop may or may not be capable of receiving a digital signal depending on the properties and configuration of the host system. According to various embodiments of the present invention, it is determined if the host system is capable of receiving a digital signal or not. Thereby the content and format of the signal provided by the field device can be configured to match the capabilities of the host system.

Accordingly, the present invention addresses the aforementioned problem that a process may be interrupted regardless of the reason and/or severity of the unreliability of the process parameter value. The process parameter value may for example be indicated as exhibiting a reduced reliability when the measured process parameter value has a reduced accuracy while still being within safe limits and not close to an extreme value. Hence, by providing the host system both with a digital signal indicating that the process parameter value has a reduced reliability when the host system is capable of receiving a digital signal and at the same time providing the process parameter value as an analog DC-value, the host system may, automatically or by means of an operator, evaluate how to respond to the indication of a reduced reliability. Thus, an advantage of the present invention is that the number of unplanned process interruptions may be reduced. Instead of an unplanned interruption, the indication of unreliability may allow for a planned interruption of the process at a suitable time and the source of the reduced reliability may be dealt with during planned maintenance.

Furthermore, an indication of the reliability of the process parameter value may be provided for each measured process parameter value. Alternatively, an indication of the reliability of the process may equally well be provided only when the measured process parameter value is determined to exhibit a reduced reliability. A digital signal indicating that a measurement value has a reduced reliability may contain any information from which conclusions concerning the reliability of the process parameter value can be drawn manually by an operator, or automatically by the host system.

According to one embodiment of the present invention the step of determining if the host system is capable of receiving a digital signal may be performed automatically. The determination may be performed automatically at the startup of the field device or host system, at predetermined time intervals, at a request from the host system, each time a process parameter value is determined, or the determination may be performed continuously. Alternatively, the determination of the capabilities of the host system may be performed by manually providing an input setting to the field device. An input setting may be manually provided to the field device at any time, such as during installation, at startup or during operation of the field device.

In one embodiment of the invention, the step of determining if the host system is capable of receiving a digital signal may comprise detecting if the host system transmits a digital signal. The host system may for example request diagnostic or other information from the field device by transmitting a digital signal. A transmission of a digital signal by the host system may then be taken as an indication that the host system is capable of also receiving a digital signal. Furthermore, if no digital signal is detected by the field device within a predetermined time span, a timeout period, it may be determined that the host-system is not capable of receiving a digital signal.

According to one embodiment of the invention, the step of determining if the host system is capable of receiving a digital signal may comprise transmitting a digital signal from the field device requesting a response from the host system in the form of a digital signal. The field device may for example request status information or other diagnostic information from the host system by transmitting a digital signal for the purpose of determining if the host system is capable of receiving the digital signal.

In one embodiment of the invention, if the process parameter is determined to have a reduced reliability, the digital signal comprising an indication of the reliability of the process parameter value may advantageously comprise information indicating why the process parameter is determined to have the reduced reliability. The information relating to the source of the reduced reliability may be used by the host system or an operator to further evaluate the severity of the reduced reliability indication. Thereby, a better basis for deciding how to handle the reduced reliability indication is provided.

According to a second aspect of the present invention, the abovementioned and other objects are achieved through a field device for determining a process parameter value, comprising: a measurement device for determining a process parameter value; circuitry for determining the reliability of the process parameter value; and signaling circuitry for providing an indication of the reliability of the process parameter value to a host system via a current loop, wherein the signaling circuitry is configurable between a first state in which an indication of the reliability is provided as a digital signal and the process parameter value as an analog DC-value, and a second state in which the reliability is provided as a predetermined analog DC-value.

Hereby, the number of unplanned process interruptions may be reduced when the host system is capable of receiving digital signals.

An indication of the reliability of the process may be provided to accompany each measured process parameter value. Alternatively, an indication of the reliability of the process may be provided only when the measured process parameter value is determined to have reduced reliability.

It should be noted that the circuitry for determining the reliability of the process parameter value and the signaling circuitry may be provided as either of one or several separate physical component(s), separate hardware blocks within a single component, or software executed by one or several microprocessors.

According to one embodiment, the field device may be a radar level gauge for determining the filling level in a tank. However, the field device may equally well be any other field device for measuring a process parameter such as a temperature sensor, a pressure sensor, a flow sensor etc.

According to one embodiment, the current loop may be a 4-20 mA current loop. In a 4-20 mA current loop, information is provided in the form of analog DC-values normally within the 4-20 mA range. However, saturation values outside the 4-20 mA range between 3.9 mA and 20.8 mA may also be used to represent a valid measurement level. The predetermined analog DC-value used to indicate that the process parameter value has a reduced reliability may for example be a value outside of the 4-20 mA range, such as 3.6 mA or 22 mA, or it may be another value which the host system is configured to identify as a DC-value indicating that the measurement value has a reduced reliability. The "end-of-range" values 4 mA and 20 mA, or the abovementioned saturation values may also be used to indicate an measurement value with a reduced reliability.

In one embodiment, the field device may be using a HART communication protocol. A current loop may in some configurations also accommodate a digital signal. An example where a host system may use digital signal is if the host system is using the HART communication protocol which operates using the frequency shift keying (FSK) principle. The digital signal is made up of two frequencies, 1.2 kHz and 2.2 kHz representing bits 1 and 0, respectively. Sine waves of these two frequencies are superimposed on the direct current (DC) analog signal cables to provide simultaneous analog and digital communications. Because the average value of the FSK signal is always zero, the 4-20 mA analog signal is not affected.

Further embodiments of, and effects obtained through this second aspect of the present invention are largely analogous to those described above for the first aspect of the invention.

According to a third aspect of the present invention, the abovementioned and other objects are achieved through a radar level gauge system, for determination of a filling level of a product contained in a tank, the radar level gauge system comprising: a transceiver for generating, transmitting and receiving electromagnetic signals; a propagation device connected to the transceiver and arranged to propagate a transmitted electromagnetic signal towards the product inside the tank, and to return a surface echo signal resulting from reflection of the transmitted electromagnetic signal at a surface of the product contained in the tank back to the transceiver; processing circuitry connected to the transceiver and comprising: filling level determination circuitry for determining the filling level based on the surface echo signal; reliability determination circuitry for determining a reliability of the determined filling level; and signaling circuitry for providing the determined filling level and an indication of the reliability of the determined filling level to a host system via a current loop, wherein the signaling circuitry is configurable between a first state in which the indication of the reliability is provided as a digital signal and the determined filling level is provided as an analog DC-value, and a second state in which the indication of the reliability is provided as a predetermined analog DC-value.

The "transceiver" may be one functional unit capable of transmitting and receiving electromagnetic signals, or a system comprising separate transmitter and receiver units.

The "propagation device" may be any device capable of propagating electromagnetic signals, including transmission line probes, waveguides and various types of antennas, such as horn antennas, array antennas etc.

Further embodiments of, and effects obtained through this third aspect of the present invention are largely analogous to those described above for the first and second aspects of the invention.

BRIEF DESCRIPTION OF THE DRAWINGS

These and other aspects of the present invention will now be described in more detail, with reference to the appended drawings showing example embodiments of the invention, wherein:

FIG. 2 schematically illustrates an exemplary application of the radar level gauge system in FIG. 1a.

DETAILED DESCRIPTION OF EXEMPLARY EMBODIMENTS OF THE INVENTION

In the present detailed description, various embodiments of a field device according to the present invention are mainly discussed with reference to a radar level gauge for determination of a filling level of a product contained in a tank. It should be noted that this by no means limits the scope of the present invention which is equally applicable to other field devices where an indication of the reliability of a process parameter is provided to a host system via a current loop, such as temperature sensors, pressure sensors, flow sensors, etc.

Furthermore, reference is mainly made to filling level determination by means of measuring the time between transmitted and reflected pulses. As is, however, evident to the person skilled in the relevant art, the teachings of the present invention are equally applicable to a radar level gauge utilizing phase information for determining the filling level through, for example, frequency-modulated continuous wave (FMCW) measurements. When pulses modulated on a carrier are used, phase information can also be utilized.

Figure 1A:
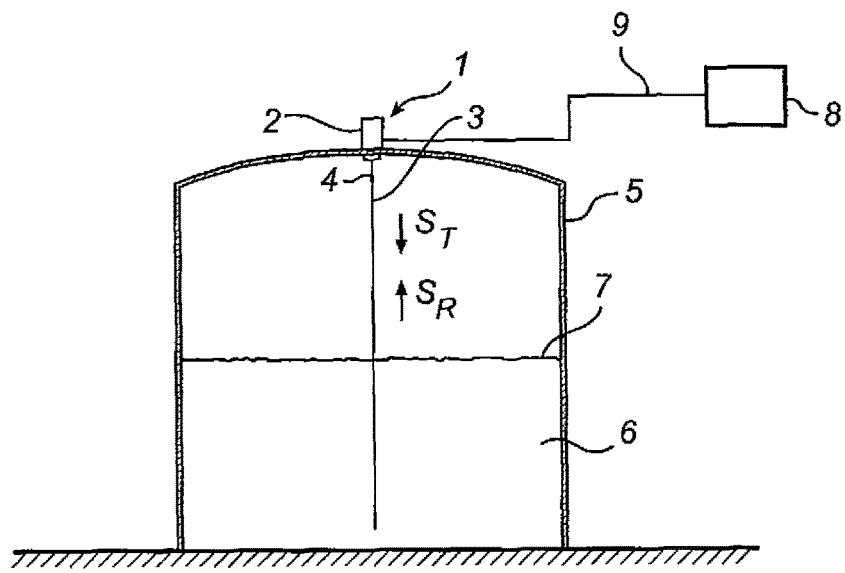
FIGS. 1a and 1b schematically illustrate a radar level gauge system according to an embodiment of the present invention installed in an exemplary tank.

FIG. 1a schematically illustrates a radar level gauge system 1 according to an embodiment of the present invention, comprising a measurement electronics unit 2, and a probe 3 having a reference reflector 4. The radar level gauge system 1 is provided on a tank 5, which is partly filled with a product 6 to be gauged. By analyzing transmitted signals $S_T$ being guided by the probe 3 towards the surface 7 of the product 6, and reflected signals $S_R$ traveling back from the surface 7, the measurement electronics unit 2 can determine the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner. The radar level gauge system 1 is further connected to a host system 8 via a current loop 9.

Figure 1B:
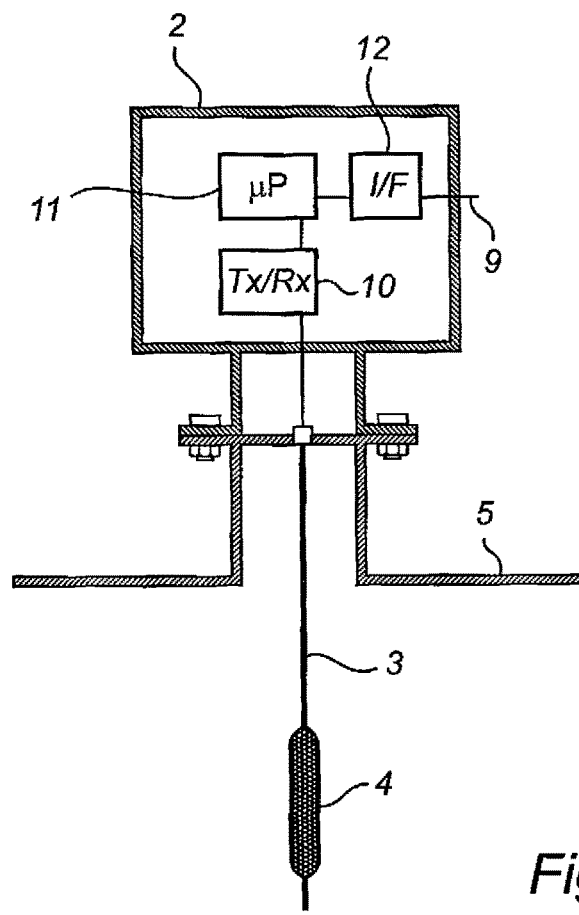

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to determine the filling level of the product 6 in the tank 5. The processing unit 11 is connected to the current loop 9 via an interface 12. Moreover, although not shown in FIG. 1b, the radar level gauge system 1 may be connectable to an external power source, may comprise an internal power source, and/or may be powered through the current loop 9.

Figure 2:
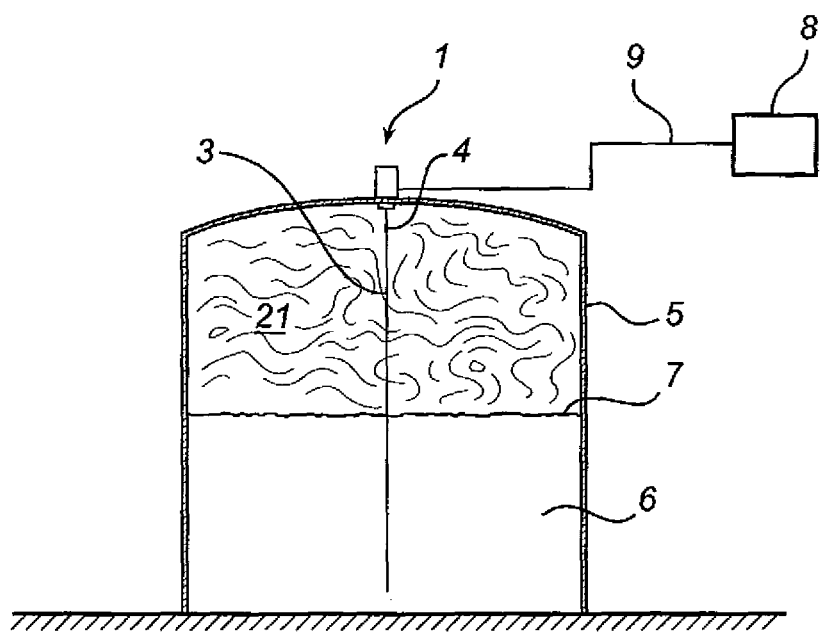

An exemplary method according to an embodiment of the present invention will now be described with reference to the schematic illustration of a radar level gauge system in a tank shown in FIG. 2 and the flowchart shown in FIG. 3 outlining the steps of the method.

Figure 3:
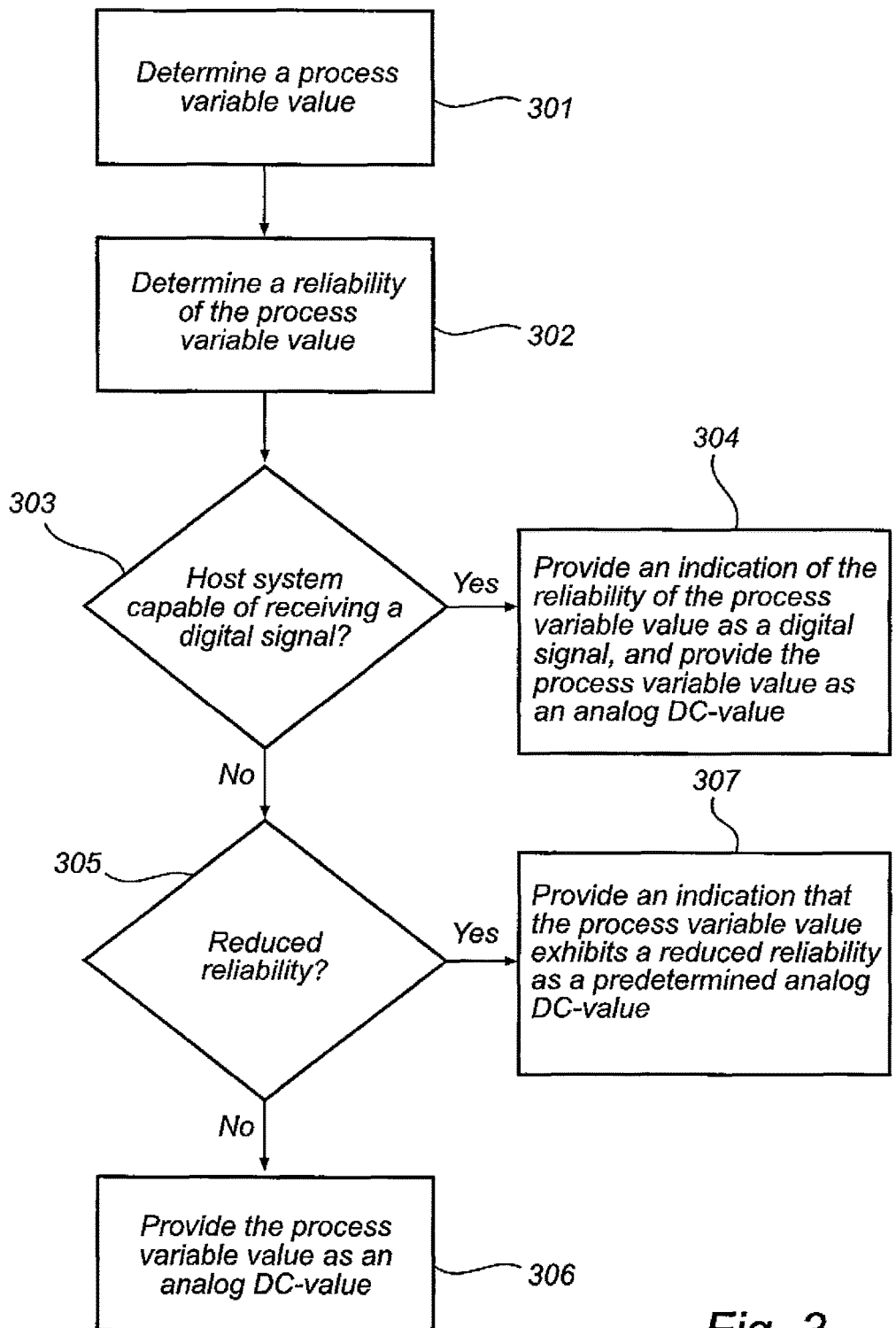
FIG. 3 is a flowchart schematically illustrating an example embodiment of the method according to the present invention

In a first step 301 in FIG. 3, the filling level of the tank 5 is determined. This determination may for example be based on the time measured between transmission of an electromagnetic signal and receipt of the reflection thereof at the interface between the atmosphere in the tank and the product contained in the tank. When measuring the filling level, vapor 21 of varying concentration and composition may be present in the atmosphere above the surface 7 of the product 6 in the tank 5. Additionally, the vapor 21 may have varying properties depending on external environmental conditions such as temperature and humidity. As the propagation properties of an electromagnetic signal along the transmission line probe 3 may depend on the dielectric constant of the atmosphere surrounding the probe 3, the presence of vapor 21 in the tank 5 may influence the measured value. In particular, the relation between the aforementioned properties of the vapor and the dielectric constant of the vapor may be unknown. Therefore, in order to avoid measurement errors resulting from the unknown effect that vapor may have on the propagation properties of the transmitted and reflected signals, a reference reflector 4 is used for calibrating the measurement to compensate for presence of vapor.

The calibration may be performed by using a reference reflector 4 located at a known position along the probe 3, measuring the distance to the reference reflector 4 and comparing the measured distance to the known distance. Thereby, a calibration factor for the propagation properties of the specific signal can be calculated. The calibration factor is then used to calibrate the measured distance to the surface 7 of the product 6 contained in the tank 5, thereby enabling an accurate measurement of the filling level of the tank also in applications with relatively large variations in the propagation properties of the atmosphere inside the tank. The reference reflector 4 may be implemented as a structure capable of reflecting electromagnetic signals traveling along the probe 3 and may be achieved by means of a structure external to the probe, an internal structure in the probe, or a combination thereof. In other embodiments, a plurality of reference reflectors may be used as described in U.S. Pat. No. 7,525,476, which is hereby incorporated by reference in its entirety. Furthermore, different reference reflectors may be provided as identical or different reflecting structures.

In the next step 302, the reliability of the process parameter value is determined. If the surface of the product is found and an echo from the reference reflector is also received, it can be assumed that the measurement is reliable. However, if the echo from the reference reflector for some reason is not detected correctly, or is not detected at all, which may be the case if the reference reflector 4 is contaminated or has fallen off from the probe 3, a value of the filling level may still be acquired but it may be considered to be less reliable as the measurement cannot be properly calibrated. Accordingly, it is determined that the acquired measurement value has a reduced reliability.

In the following step 303 it is determined if the host system 8 is capable of receiving a digital signal. The determination of the capabilities of the host system 8 is performed by the field device 1 which detects if a digital signal has been transmitted by the host system 8. If the field device 1 has received a digital signal from the host system 8 within a predetermined period of time, it is determined that the host system is also capable of receiving a digital signal. If no digital signal is received within the predetermined period of time, it is determined that the host system 8 is not capable of receiving a digital signal.

If it is determined in step 303 that that the host system 8 is capable of receiving a digital signal and for the case where, for example, the reference reflector 4 cannot be detected, but where the radar level gauge 1 determines a filling level, the radar level gauge 1 will provide the determined filling level as an analog DC-value while also providing a digital signal to the host system 8 indicating that the determined filling level has a reduced reliability according to step 304. The digital signal may comprise an indication that the source of the reduced reliability is the absence of an echo signal from the reference reflector. The specification of the source of the reduced reliability may for example allow the host system or an operator to interpret the received measurement value with reduced reliability as being within a certain range. In the normal case when it is determined in step 302 that the process variable value has its normal high reliability, an indication that this is the case may be provided as a digital signal in step 304. In other words, in case the host system is capable of receiving a digital signal, the indication of the reliability of the process variable value may always be provided to the host system.

If it is determined in step 303 that that the host system is not capable of receiving a digital signal, the process moves on to step 305, where it is determined if the process variable value exhibits a reduced reliability. In the normal case, when it is determined that the process variable value exhibits a normal (high) reliability, the process proceeds to step 306, where the process variable value is provided to the host system 8 as an analog DC value, such as a current value between 4 mA and 20 mA.

If, on the other hand, it is determined in step 305 that the process variable value exhibits a reduced reliability, the process moves on to step 307, according to which an indication that the measurement value has a reduced reliability is provided to the host system as a predetermined analog DC-value, for example 21.75 mA.

The person skilled in the art realizes that the present invention by no means is limited to the example embodiments described above. On the contrary, many modifications and variations are possible within the scope of the appended claims. For example, it should be noted that the aforementioned are merely exemplary sources of unreliability and that there may be a variety of reasons for the measured filling level to be considered to exhibit a reduced reliability such as temperature variations, probe contamination or electromagnetic disturbances. Furthermore, the general idea of the present invention is equally applicable for any field device connected to a host system via a current loop it would be desirable to provide an indication of the reliability of a measured process parameter value.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A method of providing an indication of the reliability of a process parameter value from a field device to a host system via a current loop, comprising the steps of:
    determining a process parameter value;
    determining a reliability of the determined process parameter value;
    determining whether or not the host system is capable of receiving a digital signal via the current loop;
    if the host-system is capable of receiving a digital signal via the current loop, providing, via the current loop, an indication of the reliability of the process parameter value as a digital signal, and providing the process parameter value as an analog direct current value, wherein the process parameter value is indicated as exhibiting a reduced reliability when the determined process parameter value has a reduced accuracy; and
    if the host-system is not capable of receiving a digital signal via the current loop and the process parameter value has been determined to exhibit a reduced reliability, providing, via the current loop, an indication of the reduced reliability as a predetermined analog direct current value.

2. The method according to claim 1, wherein the step of determining if the host system is capable of receiving a digital signal is performed automatically.

3. The method according to claim 1, wherein the step of determining if the host system is capable of receiving a digital signal comprises detecting if the host system transmits a digital signal.

4. The method according to claim 3, wherein if no digital signal is detected within a predetermined time span, it is determined that the host-system is not capable of receiving a digital signal.

5. The method according to claim 1, wherein the step of determining if the host system is capable of receiving a digital signal comprises transmitting a digital signal from the field device requesting a response from the host system in the form of a digital signal.

6. The method according to claim 1, wherein if the process parameter is determined to exhibit said reduced reliability, the digital signal comprising an indication of the reliability of the process parameter value comprises information indicating why the process parameter is determined to exhibit said reduced reliability.

7. A field device configured to determine a process parameter value, comprising:
    a measurement device having an output indicative of process parameter value;
    circuitry configured to determine the reliability of the process parameter value; and
    signaling circuitry configured to provide said process parameter value and an indication of the reliability of the process parameter value to a host system via a current loop,
    wherein the signaling circuitry is configurable between a first state in which said indication of the reliability is provided as a digital signal and the process parameter value is provided as an analog DC-value, wherein the process parameter value is indicated as exhibiting a reduced reliability when the measured process parameter value has a reduced accuracy, and a second state in which said indication of the reliability is provided as a predetermined analog DC-value.

8. The field device according to claim 7, wherein the configuration of the signaling circuitry is performed automatically.

9. The field device according to claim 7, wherein the field device is a radar level gauge configured to determine the filling level of a product contained in a tank.

10. The field device according to claim 7, wherein the current loop is a 4-20 mA current loop.

11. The field device according to claim 10, wherein said signaling circuitry is configured to communicate in accordance with a HART-compliant communication protocol.

12. A radar level gauge system, configured to determine a filling level of a product contained in a tank, said radar level gauge system comprising:
a transceiver configured to generate, transmit and receive electromagnetic signals;
a propagation device connected to said transceiver and arranged to propagate a transmitted electromagnetic signal towards said product inside the tank, and to return a surface echo signal resulting from reflection of the transmitted electromagnetic signal at a surface of the product contained in the tank back to said transceiver;
processing circuitry connected to said transceiver and comprising:
filling level determination circuitry configured to determine said filling level based on said surface echo signal;
reliability determination circuitry configured to determine a reliability of the determined filling level; and
signaling circuitry configured to provide said determined filling level and an indication of the reliability of the determined filling level to a host system via a current loop, wherein the signaling circuitry is configurable between a first state in which said indication of the reliability is provided as a digital signal and the determined filling level is provided as an analog DC-value, wherein the filling level is indicated as exhibiting a reduced reliability when the determined filling level has a reduced accuracy, and a second state in which said indication of the reliability is provided as a predetermined analog DC-value.

13. The radar level gauge system according to claim 12, wherein said signaling circuitry is configured to communicate in accordance with a HART-compliant communication protocol.

14. The radar level gauge system according to claim 12, wherein said propagating device comprises a radiating antenna.

15. The radar level gauge system according to claim 12, wherein said propagating device comprises a transmission line probe.

16. The radar level gauge system according to claim 15, wherein the probe comprises a reference reflector located at a known position along the probe, and wherein the reliability determination circuitry is further configured to determine the reliability of the determined filling level based on whether an echo from the reference reflector is detected correctly.

17. The method according to claim 1, wherein the process parameter value is indicated as exhibiting a reduced reliability in response to a determination that the determined process parameter value has a reduced accuracy.

18. The field device according to claim 7, wherein the process parameter value is indicated as exhibiting a reduced reliability in response to a determination that the determined process parameter value has a reduced accuracy.

19. The radar level gauge system according to claim 12, wherein the filling level is indicated as exhibiting a reduced reliability in response to a determination that the determined filing level has a reduced accuracy.

* * * * *

UNITED STATES PATENT AND TRADEMARK OFFICE
CERTIFICATE OF CORRECTION

PATENT NO. : 9,903,749 B2  Page 1 of 1
APPLICATION NO. : 13/116549
DATED : February 27, 2018
INVENTOR(S) : Tomas Wennerberg It is certified that error appears in the above-identified patent and that said Letters Patent is hereby corrected as shown below:

In the Claims

Column 10, Line 35, delete "filing", insert --filling--.

Signed and Sealed this
Thirteenth Day of November, 2018

Andrei Iancu
*Director of the United States Patent and Trademark Office*